United States Patent [19]

Turner

[11] 4,168,799
[45] * Sep. 25, 1979

[54] SOAKER HOSE

[75] Inventor: James E. Turner, Southlake, Tex.

[73] Assignee: Entek Corporation, Dallas, Tex.

[*] Notice: The portion of the term of this patent subsequent to Jan. 18, 1994, has been disclaimed.

[21] Appl. No.: 833,803

[22] Filed: Sep. 16, 1977

[51] Int. Cl.² .............................................. A01G 27/00
[52] U.S. Cl. ................................... 239/145; 138/118; 138/177; 405/45
[58] Field of Search ................. 239/145, 269; 138/118, 138/177, 178, DIG. 1, 40; 61/10-13; 260/710, 717, 720, 722, 723-725, 729, 730, 732; 264/53; 210/170, 497

[56] References Cited

U.S. PATENT DOCUMENTS

| 1,254,906 | 1/1918 | Henderson | 138/40 |
| 1,989,427 | 1/1935 | Robey | 239/145 |
| 2,645,249 | 7/1953 | Davis et al. | 138/118 |
| 2,723,934 | 11/1955 | Morris et al. | 260/722 X |
| 2,807,505 | 9/1957 | Weitzel | 239/145 |
| 3,774,648 | 11/1973 | Edlin | 138/177 |
| 4,003,408 | 1/1977 | Turner | 239/145 X |

Primary Examiner—John J. Love
Assistant Examiner—Andres Kashnikow
Attorney, Agent, or Firm—Warren H. Kintzinger

[57] ABSTRACT

A porous flexible hose primarily of crumbed rubber and synthetic rubber reclaimed from rubber tires, ground to a relatively small granular size, with metal removed; such as, for example, would pass through a 30-mesh screen, process-mixed through an extruder, with a much smaller binder mix of primarily polyethylene, in the order of 25% by weight, and with approximately 0.5% of the mixture added sulphur and 0.5% oil that can be random mixed grades of automobile engine oil. The resulting product is useful as a soil watering soaker hose that has a high degree of flexibility along its length. It is a water leaking soaker hose formed in the process through the extruder with limited foaming from steam originating from absorbed moisture in the crumbed, reclaimed rubber tire material, and from residual gases venting from the material mix, with product mix heating in the extruder, forming some open cell fluid flow paths. The foaming with steam and gases from the mix also form labyrinth passageways between the rubber tire granules and the polyethylene binder mix, and also through the binder mix that is non-compatible with the rubber granules but that forms a physical interconnective structural material binder therefor.

17 Claims, 7 Drawing Figures

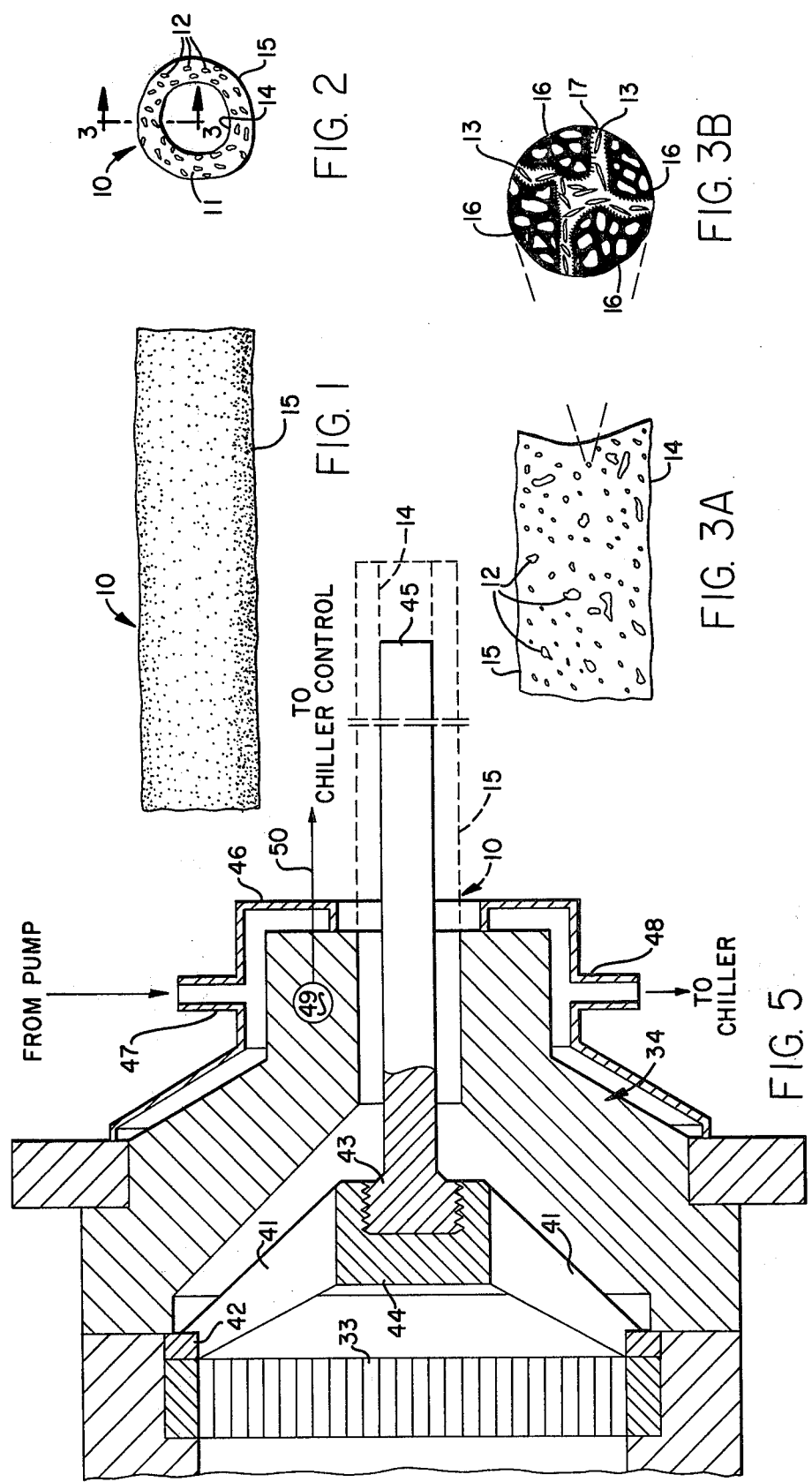

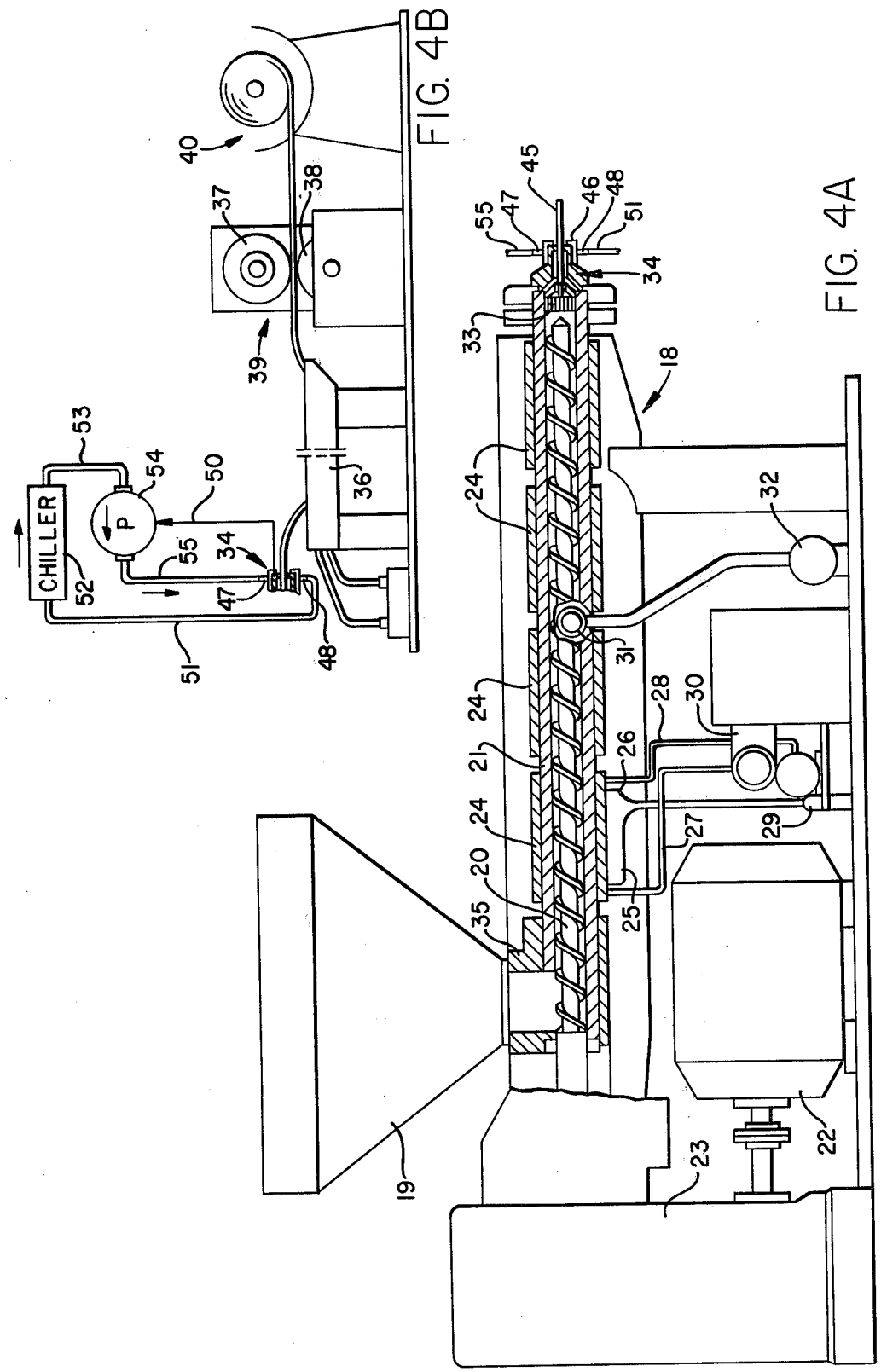

SOAKER HOSE

This invention relates in general to watering vehicles and, in particular, to a porous hose processed primarily of crumbed rubber tires of small granular size, mixed with a binder, mainly of polyethylene, and useful in applying measured amounts of water to gardens, lawns, etc.

For healthy plant growth and optimized crop production, and with turf grasses, it is water passing to the root zone area of the soil that counts. With soaker hose watering, the water enters the soil and penetrates to the root zone to benefit the growing plants. Moisture that wets only the above-ground portions of grass plants and the layers of organic material and soil above the root is of particularly no value, and may be harmful with mineral salt crustation build-up through evaporation depositions of mineral content at the surface. A dense sod, for example, may absorb a quarter-inch or more of water before any of it enters the soil. Light, above-ground waterings encourage shallow rooting, thus producing plants that are subject to quickly drying out during intervals of no watering.

Various porous hoses that have been produced in the past have a production problem in that in the process of trying to form a porous hose that actually leaks on the outer surface of the hose wall the extrusion process many times causes the outer surface to be sealed or glazed as it comes out of the extrusion die. In overcoming this problem at least one hose product is scratched or lightly cut to penetrate the surface glaze or thin sealed membrane on the outer surface. Some existing soaker hoses squirt or spew water so as to lead to greater than desired evaporation losses than is the case with my hose that sweats water that trickles off to the soil or, when buried, feeds to capillation distribution through soil in accord with water absorption characteristics of the soil. Some plastic soaker hose has a short life under ultraviolet radiation of the sun whereas my hose has a greatly extended long life expectancy. This is attained through use of reclaimed crumbed rubber from automobile casings that has significant carbon black content yielding excellent ultraviolet inhibition and longer life expectancy.

Another consideration in the production of a new product is the availability of raw material in this day of shortages, and if it can be made primarily of reclaimed rubber, and/or synthetic rubber, from used tires that present a severe disposal problem, so much the better. Many sprinkling systems have continuing labor and maintenance costs, with requirements such as moving sprinklers, walking the line, pop up or protruding sprinkler heads that many times are struck and damaged or broken off by mowers or other equipment. Further, freeze-up of pipes and other water carrying equipment is a problem, and with severe cold waves, many times causes costly damage. Another consideration is that of interference with normal yard work, with, for example, a soaker hose water distribution system with soaker hose laid on the soil surface, and in some instances soaker hose is buried at an underground depth of ten inches or more, allowing all normal yard work, including roto-tilling. It is also important that nutrients and health-giving ingredients, some insecticides and, in some instances, herbicides, be distributed directly to the subsurface root zone in the soil of areas being irrigated as may be implemented with buried soaker hose. Growth of weeds should be minimized rather than enhanced, and cultivation requirements with cash crops optimally minimized.

Underground irrigation, to many, falls under the general category of drip irrigation used, in any event, in the daily maintenance of an adequate section of the root zones of plants with moisture somewhere between dampness and saturation or field capacity throughout the growing season. This system enables the attainment of an optimized soil-water-plant relationship that is conducive to much better growth and substantially better yields, with less water applied. Evaporation is substantially totally eliminated, with buried soaker hose out of the way of people and machinery, and water, along with fertilizer when used, is applied where it obviously does the most good, right at the roots. Water seeps from the underground soaker hose, and by capillary action and absorption spreads through the root system, maintaining a constant moisture level throughout the area of treatment.

Variation in the water level content in soil can create many problems, with, for example, expansion and contraction of soil under and around slab foundations. This can be such as to cause foundations to shift around and/or cracking of the foundations, brick walls, inside plaster, and sheetrock walls in homes. Thus, an underground system for maintaining a stabilized soil moisture state would go far in eliminating such disasterous home and building damage. Aeration is important in sewage treatment systems, with air pumped into and bubbled upward through affluent in anaerobic action fluid treatment ponds and tanks, however, in most instances, attainment of desired bubble size is a problem. Most pumped-in, formed air bubbles, in many installations, are too large and gravitate to the surface much too rapidly, so any system that would create small bubbles such as would very slowly drift upward through an affluent mix, is highly desired.

It is therefore a principal object of this invention to provide a soaker hose irrigation system capable of efficiently supplying water to plants.

Another object with such irrigation systems is to minimize water requirements, to minimize evaporation loss to the air, and to avoid mineral salt build-up in the soil.

A further object is to attain a steady, slow-weeping application of water, feeding a capillary absorption distribution action through soil through needed periods of water irrigation.

Still another object is the attainment of stabilized soil conditions under and around building foundations and other structures such as swimming pools.

Features of this invention useful in accomplishing the above objects include, in irrigation soaker hose, a hose made primarily of ground-up reclaimed rubber and/or synthetic rubber, such as obtained from old tires. The reclaimed rubber granuals, that are ground to a size such as would pass through a 30-mesh screen, are process-mixed through an extruder, with a much smaller amount of binder ingredients that typically include: a binder mix of primarily polyethylene. The transverse cross-sectional area of the hose walls is thick enough to have labyrinth passageways for seeping of water to the exterior of the hose without soil-damaging water jets. The soaker hose is usable as a subsurface irrigation buried pipe, while having a high degree of flexibility along its length. The soaker hose is formed in the process through the extruder, with limited foaming from steam originating from absorbed moisture in the ground, reclaimed rubber tire material, and from residual gasses venting from the material mix, with product mix heating in the extruder, forming some open-cell fluid flow paths. Labyrinth passageways between rubber tire granular material and polyethylene binder mix, and through the binder mix, are also formed with the steam and gas foaming, or blowing, as the soaker hose is extrusion process formed.

A specific embodiment representing what is presently regarded as the best mode of carrying out the invention is illustrated in the accompanying drawings.

In the drawings:

FIG. 1 represents a partial side elevation view of applicant's irrigation porous soaker hose;

FIG. 2, an end view of the soaker hose of FIG. 1;

FIG. 3A, an enlarged section of soaker hose wall taken along line 3—3 of FIG. 2;

FIG. 3B, a further enlargement of a small portion of the soaker hose wall section of FIG. 3A;

FIG. 4A, a partially cut away and sectioned view of a vented and temperature regulated screw type extruder used in producing the porous soaker hose;

FIG. 4B, a partial side elevation view of a long, extended, cold water tank (or trough) receiving hot soaker hose from the extruder die, a soaker hose puller, and a hose coiler; and, FIG. 5, a partially cut away and sectioned view of the extruder die tip end.

Referrring to the drawings:

The porous soaker hose 10 with a short length, shown in FIG. 1, and in end view in FIG. 2, is made primarily or reclaimed rubber-like, previously vulcanized material such as that recovered from chopped-up old rubber tires with the metal removed. This rubber-like, previously vulcanized material is reground to generally less than one-sixteenth inch diameter granual size, even down to a size that passes through a 30-mesh screen, before being process mixed with binder material, forming a matrix interlocking the rubber-like granuals in the processed pipe 10. While the wall 11 thickness to pipe I.D. is such, with the soaker hose material compounded for the finished pipe, to give reasonable structural integrity against soil loading collapse when buried in the soil as an underground irrigation water seeping soaker hose, it has a high degree of flexibility along its length in adjusting to required bends and turns necessary for both above ground use and underground installations. Foaming or blowing during product mix processing to the finish pipe 10 forms random pockets 12 (or voids) in the pipe wall 11, such as shown in more detail in the wall section enlargement of FIG. 3A where passageways to the exterior are not formed, or are late in forming with the blowing process action. Irregularly shaped labyrinth type channels 13 (shown in the further enlargement of FIG. 3B, an enlargement in the order of approximately 120X), formed in the blowing process action are an essential feature of the finished porous soaker hose product. Enough blow process formed channels 13 are formed, interconnecting the inner surface 14 and outer surface 15 of the soaker hose 10, either individually or via interconnected channels 13, to provide the desired through-the-wall seepage passageways. While the blowing formed pockets 12 are not the desired result, some of them do interconnect with some of blowing process formed channels 13, as part of some of the through-the-wall seepage passageways. The desired blowing process is provided primarily with steam from moisture previously absorbed by the previously vulcanized material granuals 16, and some residual gases in the granuals and/or binder material used in making soaker hose 10, with most blowing process formed labyrinth type channels 13 being developed in and through the interconnecting matrices 17 formed by the binder material interlocking the granuals 16 into the product soaker hose 10. With processing of the soaker hose, while the granuals 16 generally retain their physical integrity, there is some degree of surface material welding or merging with the binder material.

Porous soaker hose 10 is extruded from a two stage wave screw extruder 18, such as shown in FIG. 4A, with the ingredient mix fed from hopper 19 to the product mix drive wave screw 20 contained within and extending through substantially the entire length of the relatively long extruder cylinder 21. Extruder 18 is generally typical of screw type extruders commercially available in both this country and abroad, equipped with a drive motor 22, a gear drive train section 23 output driving the wave screw 20. The extruder 18 is also equipped with a plurality of heating and cooling cylinder barrels 24 longitudinally positioned along the length of extruder cylinder 21, with each having cast-in resistance elements connected through wires 25 and 26, and cast-in cooling coils connected through cooling fluid lines 27 and 28 to electrical power source control 29 and cooling fluid source control 30, such as shown with only one of the cylinder barrels 24, as a matter of convenience. A vent 31, connected to a vacuum control 32, is positioned at any convenient location along the extruder cylinder 21 and wave screw 20, longitudinally, after the product mix temperature has risen, through heating control and product mix working, that blow venting can occur through the binder material content of the product mix. The other vent 31 position constraint is that it must be positioned far enough ahead of pressure head screen 33 that there is not as yet a reflected back pressure build up at that location along the wave screw 20. The product mix, forced through pressure head screen 33, is extruded from the extruder die 34 where effective blowing creation of irregularly shaped labyrinth type channels 13 occurs with lowering of product material pressure from the high pressures at pressure head screen 33 down to atmospheric pressure. The feed throat member 35 below hopper 19 may be equipped with cooling and/or heating structure to further aid in temperature control of the product mix and extension of the possible positioning range of vent 31 toward the hopper 19.

Porous soaker hose 10 being extruded from the extruder die 34 very quickly enters, as shown in FIG. 4B, a cooling trough 36, approximately forty feet long, filled with chilled water, at approximately 35° F. This quickly congeals the soaker hose binder matrices, with the blowing generated through wall passageways desired in the finished product. The soaker hose 10 is drawn from the cooling trough 36 by rubber tire wheeled 37 and 38 puller assembly 39, and passed to a conventional reel hose coiler 40.

Referring also to the FIG. 5 showing of the enlarged extruder die 34 tip end of the extruder 18 product mix forced through pressure head screen 33 flows by thin vains 41 extended from mount ring 42 as supports for porous soaker hose I.D. mandrel 43 and mandrel base 44 into which the I.D. die mandrel 43 is threaded. The mandrel 43 is found with extension 45 that extends up to approximately 8 to 12 inches beyond the extruder die 34 output opening outer end. A cooling water jacket 46 is also provided around the output end of die 34 with the jacket 46 having an input port 47 and an outlet port 48. A temperature sensing thermocouple 49 embedded in the output end of die 34 has, as also shown in FIG. 4B, a control line 50 connection to the cooling fluid circulation pump and control unit 54 for controlled circulation of cooling fluid from the fluid chiller reservoir 52, through line 53 to the pump unit 54, through line 55 to jacket inlet port 47, and from jacket outlet port 48 through line 51 back to the fluid chiller reservoir 52. This cooling control system is so set as to maintain a cool temperature in the die 34 in the area of thermocouple 49 down in approximately the 50–70° F. range in order that there be minimized plasticizing at the surface and limited scruffing of the outer surface of the hose 10 as it is extruded from the die. Cooling of the die 34 in this manner also cools the outer surface of the hose 10 such as to prevent (or minimize) heat sealing or glazing of the hose 10 outer surface 15 and thereby avoids the problems heat sealing or glazing would present.

Excellent product production runs are obtained, for example, with pre-vulcanized material granuals crumbed from old rubber tires with metal removed but soft cording remnants remaining in a granular size consistency that would pass through a 30 mesh screen. These pre-vulcanized material granuals, as approximately 75% of the product mix, are mixed with the remaining 25% of the product mix in the hopper 19 of extruder 18. This is with the product mix comprised of, by approximate percentages:

Pre-vulcanized material granuals—75%
Polyethylene (high density)—24%
Sulphur—0.5%
Oil—0.5%

High density polyethylene has been used having a density of 0.94 to 0.947 and a melt index of 0.22 to 0.55. The oil used can be used dirty engine oil picked up from service stations and other automotive centers. The oil acts as a plasticizer helping bind plastic together in a better more complete bond with itself and the old tire rubber crumbs. The oil also aids as a lubricant helping slide the plasticized molten resin through the extruder die to give a fairly uniform outer hose surface without excessive scruffing roughness. Addition of the oil also improves leaking consistency of the hose with the improved plasticizing and reduced scruffing friction in the extruder die. Sulphur, a vulcanizing agent in various and sundry rubber compounds, aids in binding and revulcanizing the rubber particles together again.

The product mix is fed from the hopper 19 into the input end of the extruder cylinder 21 to product mix drive screw 20, where heat input and heat of working initially brings the product mix temperature up to approximately 300° F. Next, down the screw drive in the direction of material flow, before, and as the product mix approaches vent 31, the product mix temperature is raised to approximately 350° F., generally in the range of 350° to 400° F., and then with venting and immediately thereafter the product mix is cooled down to approximately 300° F. Then the product mix is heated up again to approximately 350° F. as the product mix is approaching the pressure head screen 33, along with a pressure build up to the approximate range 2000 to 3500 p.s.i. at the screw 20 drive pressure side of the pressure head screen 33. Finally, as the hose 10 is being extruded from die 34, the outer surface is cooled, with cooling of the die outlet down to approximately 50°–70° F., to prevent outer surface sealing or glazing. The process temperatures used are generally high enough to transform the binder material content of the product mix to the molten fluid plastic state such that flow venting can occur therethrough while the pre-vulcanized material granuals generally retain their integrity, other than for some degree of surface welding or merging with the binder material in the interconnecting matrices 17. The porous hose 10 is screw pushed out through the extruder die 34 into cooling trough 36 from which it is pulled and then rolled. Venting to a vacuum of 20 inches of mercury at vent 31 gives a product standard hose with a seepage flow rate of 15 gallons per 100 feet per hour at five p.s.i. internal water pressure with the effective blow venting seepage passage action occurring as the hose 10 is being extruded to the atmosphere. Venting to a five inch mercury vacuum with approximately the same product process temperatures results in the highest leak rate of 40 gallons per 100 feet per hour at 5 pounds p.s.i. water pressure. Further, venting to twenty-five inches of mercury vacuum results in the lowest leak hose, with 12 gallons per 100 feet per hour at 5 pounds p.s.i. water pressure. The venting provided at vent 31 is quite effective at the product mix temperature at that process location at stabilizing the residual moisture and gas content in the product mix for good uniform blowing action control as hose 10 is extruded to atmosphere from the die end.

The product mix may be varied with the pre-vulcanized material granuals being in the range of approximately 60 to 85 percent of the product mix, and the binder material being in the corresponding related range of approximately 40 to 15 percent of the product mix. In any event, the binder substance is transformed to the plastic or molten state at the process temperatures used, and with mixing action within the screw extruder while the previously vulcanized material granuals generally retain their structural integrity. It should be noted that the soaker hose 10 can be used as a regular watering hose simply by unscrewing a cap from the hose end. With the cap removed, pressure is relieved and hose wall leaking is thereby reduced to a minimum to substantially result, in effect, a regular watering hose. The soaker hose may be manufactured in various lengths with standard hose fittings so that the soaker hose may be connected to standard faucets such as a ¾ inch threaded faucet.

Whereas this invention is herein illustrated and described primarily with respect to several embodiments hereof, it should be realized that various changes may be made without departing from essential contributions to the art made by the teachings hereof.

I claim:

1. A porous hose: comprising, primarily reclaimed rubber-like previously vulcanized material; a smaller portion binder mix of polyethylene, sulfur, and oil; with hose wall transverse cross-sectional area greater than transverse cross-sectional area of the hose opening; and with the hose walls containing a multiplicity of relatively small, in transverse cross-section, irregularly shaped labyrinth type channels providing many through-the-wall seepage passageways.

2. The porous hose of claim 1, with said rubber-like, previously vulcanized material comprising crumbed bits generally less than one-sixteenth inch in diameter.

3. The porous hose of claim 2, with the smaller binder mix of polyethylene, sulfur, and oil comprising a percentage by weight in the product of approximately 25%.

4. The porous hose of claim 3, with said smaller binder mix comprising a predominance of polyethylene and substantially smaller percentages by weight of sulfur and oil.

5. The porous hose of claim 4, with said percentage by weight of sulfur and oil comprising approximately equal amounts of sulfur and oil totaling approximately 1 percent.

6. The porous hose of claim 4, with said polyethylene having a density of approximately 0.946 and a melt point in the range of 0.22 to 0.55.

7. The porous hose of claim 6, with said hose comprising a heat fused extruded casing of said materials, the outer surface thereof having been rapidly chilled as extruded.

8. The porous of claim 7, with said labyrinth type channels being sized to substantially preclude seepage therethrough of water flowing through said hose at a predetermined normal flow pressure.

9. The porous hose of claim 8, with said oil comprising used vehicle engine oil.

10. A porous hose: consisting primarily of bits of reclaimed vehicle tire casings less the metallic content thereof; a smaller binder material amount of polyethylene, sulfur, and oil; with hose wall transverse cross-sectional area greater than transverse cross-sectional area of the hose opening; and with the hose walls containing a multiplicity of relatively small, in transverse cross-section, irregularly shaped labyrinth type channels providing many through-the-wall seepage passageways.

11. The porous hose of claim 10, with said bits of tire casings comprising casings crumbed to form bits generally less than one-sixteenth inch diameter granular size, and comprising a percentage by weight in the product of approximately 75%.

12. The porous hose of claim 11, with said smaller binder material amount of polyethylene, sulfur and oil being comprised substantially of polyethylene.

13. The porous hose of claim 12, with said percentages by weight of sulfur and oil comprising approximately equal percentages of sulfur and oil totaling approximately 1 percent.

14. The porous hose of claim 13, with said polyethylene having a density of approximately 0.946 and a melt point in the range of 0.22 to 0.55.

15. The porous hose of claim 14, with said hose comprising a heat fused extruded casing of said materials, the outer surface thereof having been rapidly chilled as extruded.

16. The porous hose of claim 15, with said laybrinth type channels being sized to substantially preclude seepage therethrough of water flowing through said hose at a predetermined normal flow pressure.

17. The porous hose of claim 16, with said oil comprising used vehicle engine oil.

* * * * *